(12) United States Patent
Bar-Sade et al.

(10) Patent No.: US 12,170,632 B2
(45) Date of Patent: Dec. 17, 2024

(54) SYSTEMS AND METHODS FOR MULTIPLE HAPS BASE STATION CONNECTION

(71) Applicant: Apple Inc., Cupertino, CA (US)

(72) Inventors: Idan Bar-Sade, Sunnyvale, CA (US); Sree Ram Kodali, San Jose, CA (US); Ajay Panchal, San Diego, CA (US)

(73) Assignee: Apple Inc., Cupertino, CA (US)

( * ) Notice: Subject to any disclaimer, the term of this patent is extended or adjusted under 35 U.S.C. 154(b) by 361 days.

(21) Appl. No.: 17/844,553

(22) Filed: Jun. 20, 2022

(65) Prior Publication Data

US 2023/0093722 A1   Mar. 23, 2023

Related U.S. Application Data

(60) Provisional application No. 63/247,213, filed on Sep. 22, 2021.

(51) Int. Cl.
| | |
|---|---|
| *H04L 5/00* | (2006.01) |
| *H04J 1/12* | (2006.01) |
| *H04W 48/20* | (2009.01) |
| *H04W 72/0453* | (2023.01) |
| *H04W 76/15* | (2018.01) |

(52) U.S. Cl.
CPC .............. *H04L 5/0069* (2013.01); *H04J 1/12* (2013.01); *H04W 48/20* (2013.01); *H04W 72/0453* (2013.01); *H04W 76/15* (2018.02)

(58) Field of Classification Search
CPC ......... H04J 1/12; H04W 48/16; H04W 48/20; H04W 64/003; H04W 72/0453; H04W 76/15; H04L 5/0069

USPC .......................................................... 370/329
See application file for complete search history.

(56) References Cited

U.S. PATENT DOCUMENTS

| | | | |
|---|---|---|---|
| 12,057,925 B2* | 8/2024 | Qaise et al. ....... | H04B 7/18504 |
| 2016/0150516 A1* | 5/2016 | Ando .................... | H04W 72/51 |
| | | | 455/561 |
| 2018/0313929 A1* | 11/2018 | Bitra ...................... | G01S 5/021 |
| 2020/0322805 A1* | 10/2020 | Wang .................... | H04W 88/10 |
| 2021/0399790 A1 | 12/2021 | Morozs et al. | |
| 2022/0038917 A1 | 2/2022 | Suzuki | |
| 2022/0346035 A1* | 10/2022 | Ioffe ................... | H04W 56/001 |

(Continued)

FOREIGN PATENT DOCUMENTS

WO    2020/231523 A1    11/2020

*Primary Examiner* — Robert J Lopata
(74) *Attorney, Agent, or Firm* — FLETCHER YODER PC

(57) ABSTRACT

This disclosure is directed towards improved methods for identifying one or more base stations for connection with user equipment. The user equipment may establish a connection with a base stations based on an estimated location of the base station. Additionally, the user equipment may receive an indication from the base station to scan for additional base stations at additional estimated locations. Further, the user equipment may determine one or more connection parameters (e.g., distance from communication hub to user equipment, angle of communication hub relative to user equipment, shadowing at the communication hub, and the like) associated with the base stations within the geographical area. The user equipment may establish connection with base stations that are determined to have the best signal strength based on the connection parameters.

20 Claims, 5 Drawing Sheets

(56) References Cited

U.S. PATENT DOCUMENTS

2023/0309144 A1* 9/2023 Zhu .................. H04W 74/0808
2024/0188022 A1* 6/2024 Chiba .................. H04W 84/06

* cited by examiner

SYSTEMS AND METHODS FOR MULTIPLE HAPS BASE STATION CONNECTION

CROSS-REFERENCE TO RELATED APPLICATION

This application claims the benefit of U.S. Provisional Application No. 63/247,213, filed Sep. 22, 2021, entitled "SYSTEMS AND METHODS FOR MULTIPLE HAPS BASE STATION CONNECTION," the disclosure of which is incorporated by reference in its entirety for all purposes.

BACKGROUND

The present disclosure relates generally to wireless communication, and, more particularly, improved methods for establishing wireless communication with communication hubs, such as base stations.

An electronic device (e.g., user equipment) may establish a connection with a communication hub that may be a relatively large distance away from the electronic device, such as in the case of a High Altitude Platforms (HAPs) base station that may have an altitude between 8 and 1,500 kilometers. However, transmitted signals from the electronic device may undergo significant path loss due to this large distance from the HAPs base station. Further, the large distance between the electronic device and the HAPs base station may result in data loss in the signal or even disconnection of the electronic device from the HAPs base station. Moreover, in some cases, the HAPs base station may change position over time, which may increase the path loss or even cause disconnection of the electronic device from the HAPs base station.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, a mobile device includes one or more antennas, a transceiver configured to send and receive signals via the one or more antennas, and processing circuitry communicatively coupled to the transceiver and configured to establish a first connection with a first base station based on a first estimated location of a first base station. Additionally, the processing circuitry is configured to receive an indication from the first base station to scan for a second base station at a second estimated location, establish a second connection with a second base station based on the second estimated location and one or more connection parameters, and send or receive signals, using the transceiver, with the first base station and the second base station.

In another embodiment, a method for mobile communications includes receiving, via a receiver of a user equipment, a first estimated location of a first base station, and scanning, via the receiver, the first estimated location. The method further includes establishing a connection with the first base station, receiving, via the receiver, an indication of a second base station, and determining, at processing circuitry of the user equipment, one or more connection parameters for the second base station. Additionally, the method includes establishing a connection with the second base station based on the one or more connection parameters, and sending, using a transmitter of the user equipment, signals to the first base station and the second base station.

In an additional embodiment, a mobile device includes a memory, one or more antennas, a transceiver configured to send and receive signals via the one or more antennas, and processing circuitry communicatively coupled to the transceiver and configured to receive an estimated location of a first base station and scan the estimated location for the first base station. The processing circuitry is further configured to establish a connection with the first base station based on scanning the estimated location, and cause the transceiver to receive an indication from the first base station, and cause the transceiver to receive one or more connection parameters of the one or more additional base stations from a memory. Additionally, the processing circuitry is configured to establish a connection with a second base station of the one or more additional base stations based on the one or more connection parameters, and cause the transceiver to send or receive signals with the first base station and the second base station.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings described below in which like numerals refer to like parts.

DETAILED DESCRIPTION OF SPECIFIC EMBODIMENTS

Figure 1:
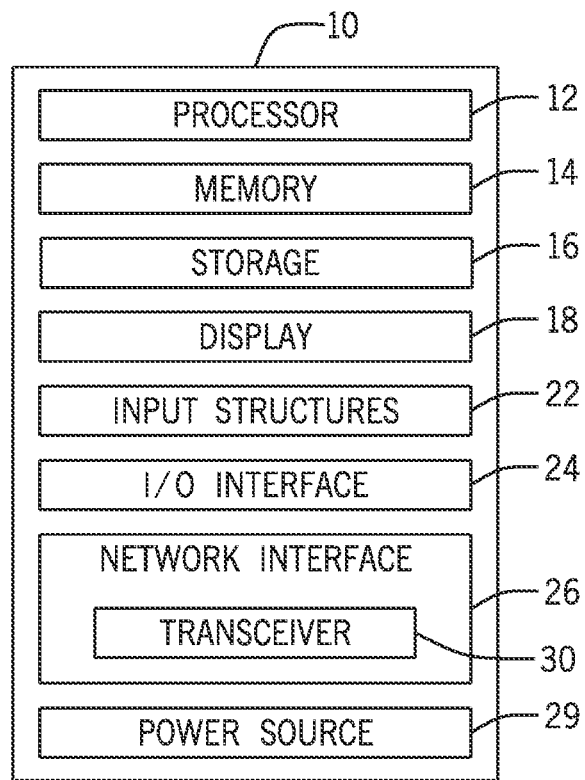
FIG. 1 is a block diagram of user equipment, according to embodiments of the present disclosure.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. Furthermore, the particular features, structures, or characteristics may be combined in any suitable manner in one or more embodiments. Use of the terms "approximately," "near," "about," "close to," and/or "substantially" should be understood to mean including close to a target (e.g., design, value, amount), such as within a margin of any suitable or contemplatable error (e.g., within 0.1% of a target, within 1% of a target, within 5% of a target, within 10% of a target, within 25% of a target, and so on). Moreover, it should be understood that any exact values, numbers, measurements, and so on, provided herein, are contemplated to include approximations (e.g., within a margin of suitable or contemplatable error) of the exact values, numbers, measurements, and so on.

Wireless communication systems are used to deliver a variety of services such as video data, text data, and the like, to one or more user equipment ("UE") of the wireless communication system. In some cases, a communication network may leverage one or more communication hubs to deliver wireless communication services. One of the challenges of wireless communication is the fact that certain communication hubs such as base stations, high altitude base stations, satellites, ground stations, and so on, may correspond to different connection strengths with the user equipment at different times depending on multiple connection parameters (e.g., distance from communication hub to user equipment, angle of communication hub relative to user equipment, shadowing at the communication hub, and the like). However, transmitted signals may undergo large path loss due to this large distance, which may result in data loss in the signal or even disconnection. Moreover, in some cases, the communication hub (e.g., a High Altitude Platforms (HAPs) base station) may move, which may increase the path loss or even cause disconnection. To mitigate these effects, the user equipment may connect to the communication hub based on network connection parameters to improve network connectivity. However, it may be difficult for the user equipment to identify all communication hubs that are accessible within a coverage area and the connection parameters corresponding to all the communication hubs to determine the one or more communication hubs with connection parameters corresponding to better connectivity.

Embodiments herein provide various apparatuses and techniques to enable user equipment to identify communication hubs accessible within a coverage area and corresponding connection parameters of the communication hubs. To do so, the user equipment may scan an area and establish connection with a communication hub within the area. The communication hub may instruct the user equipment to determine one or more connection parameters corresponding to one or more additional communication hubs within the area, or the user equipment may utilize a pre-stored list that includes connection parameters corresponding to one or more additional communication hubs within the area. The user equipment may determine, based on determining network parameters of the identified communication hubs, which one or more communication hubs to establish a connection with based on a signal strength of the one or more communication hubs. The user equipment may update the list of network parameters over time, and adjust the communication hub connections based on the signal strength of the one or more communication hubs determined from the updated list of network parameters. The user equipment may sync to the communication hubs and receive data from the communication hubs efficiently based on the connection parameters, and update connections to communication hubs over time based on updated connection parameters.

In other embodiments, the user equipment may store a connection parameters list in a memory of the user equipment. The user equipment may then connect to one or more communication hubs based on the connection parameters in the stored list. It should be understood, that any suitable method may be implemented in terms of the user equipment determining a connection parameter list associated with possible communication hub for connection within an area. The user equipment may be any suitable electronic device that can establish a wireless connection with the one or more communication hubs. For example, FIG. 1 is a block diagram of user equipment 10 (e.g., an electronic communication device), according to embodiments of the present disclosure. The user equipment 10 may include, among other things, one or more processors 12 (collectively referred to herein as a single processor for convenience, which may be implemented in any suitable form of processing circuitry), memory 14, nonvolatile storage 16, a display 18, input structures 22, an input/output (I/O) interface 24, a network interface 26, and a power source 29. The various functional blocks shown in FIG. 1 may include hardware elements (including circuitry), software elements (including machine-executable instructions) or a combination of both hardware and software elements (which may be referred to as logic). The processor 12, memory 14, the nonvolatile storage 16, the display 18, the input structures 22, the input/output (I/O) interface 24, the network interface 26, and/or the power source 29 may each be communicatively coupled directly or indirectly (e.g., through or via another component, a communication bus, a network) to one another to transmit and/or receive data between one another. It should be noted that FIG. 1 is merely one example of a particular implementation and is intended to illustrate the types of components that may be present in user equipment 10.

By way of example, the user equipment 10 may include any suitable computing device, including a desktop or notebook computer (e.g., in the form of a MacBook®, MacBook® Pro, MacBook Air®, iMac®, Mac® mini, or Mac Pro® available from Apple Inc. of Cupertino, California), a portable electronic or handheld electronic device such as a wireless electronic device or smartphone (e.g., in the form of a model of an iPhone® available from Apple Inc. of Cupertino, California), a tablet (e.g., in the form of a model of an iPad® available from Apple Inc. of Cupertino, California), a wearable electronic device (e.g., in the form of an Apple Watch® by Apple Inc. of Cupertino, California), and other similar devices. It should be noted that the processor 12 and other related items in FIG. 1 may be generally referred to herein as "data processing circuitry." Such data processing circuitry may be embodied wholly or in part as software, hardware, or both. Furthermore, the processor 12 and other related items in FIG. 1 may be a single contained processing module or may be incorporated wholly or partially within any of the other elements within the user equipment 10. The processor 12 may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that may perform calculations or other manipulations of information. The processors 12 may include one or more application processors, one or more baseband processors, or both, and perform the various functions described herein.

In the user equipment 10 of FIG. 1, the processor 12 may be operably coupled with a memory 14 and a nonvolatile storage 16 to perform various algorithms. Such programs or instructions executed by the processor 12 may be stored in any suitable article of manufacture that includes one or more tangible, computer-readable media. The tangible, computer-readable media may include the memory 14 and/or the nonvolatile storage 16, individually or collectively, to store the instructions or routines. The memory 14 and the nonvolatile storage 16 may include any suitable articles of manufacture for storing data and executable instructions, such as random-access memory, read-only memory, rewritable flash memory, hard drives, and optical discs. In addition, programs (e.g., an operating system) encoded on such a computer program product may also include instructions that may be executed by the processor 12 to enable the user equipment 10 to provide various functionalities.

In certain embodiments, the display 18 may facilitate users to view images generated on the user equipment 10. In some embodiments, the display 18 may include a touch screen, which may facilitate user interaction with a user interface of the user equipment 10. Furthermore, it should be appreciated that, in some embodiments, the display 18 may include one or more liquid crystal displays (LCDs), light-emitting diode (LED) displays, organic light-emitting diode (OLED) displays, active-matrix organic light-emitting diode (AMOLED) displays, or some combination of these and/or other display technologies.

The input structures 22 of the user equipment 10 may enable a user to interact with user equipment 10 (e.g., pressing a button to increase or decrease a volume level). The I/O interface 24 may enable the user equipment 10 to interface with various other electronic devices, as may the network interface 26. In some embodiments, the I/O interface 24 may include an I/O port for a hardwired connection for charging and/or content manipulation using a standard connector and protocol, such as the Lightning connector provided by Apple Inc. of Cupertino, California, a universal serial bus (USB), or other similar connector and protocol. The network interface 26 may include, for example, one or more interfaces for a personal area network (PAN), such as an ultra-wideband (UWB) or a BLUETOOTH® network, a non-terrestrial network (including networks, or segments of networks, using an airborne or spaceborne vehicle for transmission, where airborne vehicles refer to High Altitude Platforms (HAPs) encompassing Unmanned Aircraft Systems (UAS)—including tethered UAS, Lighter than Air UAS and Heavier than Air UAS—operating at altitude; typically between 8 and 50 kilometers, quasi-stationary), for a local area network (LAN) or wireless local area network (WLAN), such as a network employing one of the IEEE 802.11x family of protocols (e.g., WI-FI®), and/or for a wide area network (WAN), such as any standards related to the Third Generation Partnership Project (3GPP), including, for example, a 3rd generation (3G) cellular network, universal mobile telecommunication system (UMTS), 4th generation (4G) cellular network, long term evolution (LTE®) cellular network, long term evolution license assisted access (LTE-LAA) cellular network, 5th generation (5G) cellular network, and/or New Radio (NR) cellular network, a satellite network, and so on. In particular, the network interface 26 may include, for example, one or more interfaces for using a Release-15 cellular communication standard of the 5G specifications that include the millimeter wave (mmWave) frequency range (e.g., 24.25-300 gigahertz (GHz)) and/or any other cellular communication standard release (e.g., Release-16, Release-17, any future releases) that define and/or enable frequency ranges used for wireless communication. The network interface 26 of the user equipment 10 may allow communication over the aforementioned networks (e.g., 5G, Wi-Fi, LTE-LAA, and so forth).

The network interface 26 may also include one or more interfaces for, for example, broadband fixed wireless access networks (e.g., WIMAX®), mobile broadband Wireless networks (mobile WIMAX®), asynchronous digital subscriber lines (e.g., ADSL, VDSL), digital video broadcasting-terrestrial (DVB-T®) network and its extension DVB Handheld (DVB-H®) network, ultra-wideband (UWB) network, alternating current (AC) power lines, and so forth. The power source 29 of the user equipment 10 may include any suitable source of power, such as a rechargeable lithium polymer (Li-poly) battery and/or an alternating current (AC) power converter.

Figure 2:
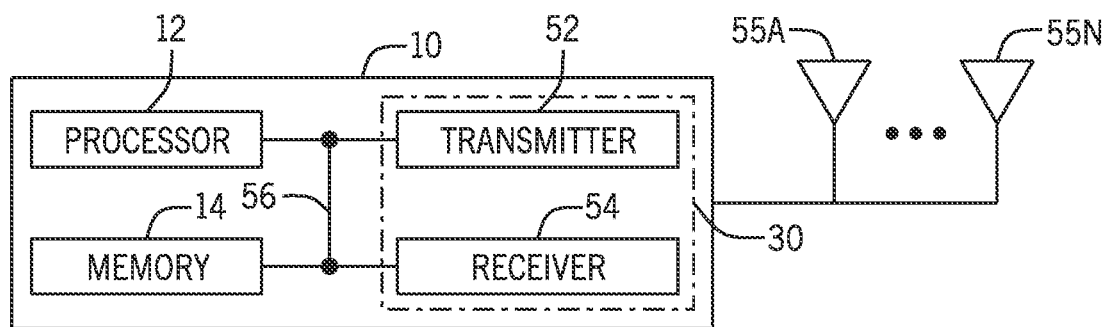
FIG. 2 is a functional diagram of the user equipment of FIG. 1, according to embodiments of the present disclosure.

FIG. 2 is a functional diagram of the user equipment 10 of FIG. 1, according to embodiments of the present disclosure. As illustrated, the processor 12, the memory 14, the transceiver 30, a transmitter 52, a receiver 54, and/or antennas 55 (illustrated as 55A-55N, collectively referred to as an antenna 55) may be communicatively coupled directly or indirectly (e.g., through or via another component, a communication bus, a network) to one another to transmit and/or receive data between one another.

The user equipment 10 may include the transmitter 52 and/or the receiver 54 that respectively enable transmission and reception of data between the user equipment 10 and an external device via, for example, a network (e.g., including base stations) or a direct connection. As illustrated, the transmitter 52 and the receiver 54 may be combined into the transceiver 30. The user equipment 10 may also have one or more antennas 55A-55N electrically coupled to the transceiver 30. The antennas 55A-55N may be configured in an omnidirectional or directional configuration, in a single-beam, dual-beam, or multi-beam arrangement, and so on. Each antenna 55 may be associated with a one or more beams and various configurations. In some embodiments, multiple antennas of the antennas 55A-55N of an antenna group or module may be communicatively coupled a respective transceiver 30 and each emit radio frequency signals that may constructively and/or destructively combine to form a beam. The user equipment 10 may include multiple transmitters, multiple receivers, multiple transceivers, and/or multiple antennas as suitable for various communication standards. In some embodiments, the transmitter 52 and the receiver 54 may transmit and receive information via other wired or wireline systems or means.

As illustrated, the various components of the user equipment 10 may be coupled together by a bus system 56. The bus system 56 may include a data bus, for example, as well as a power bus, a control signal bus, and a status signal bus, in addition to the data bus. The components of the user equipment 10 may be coupled together or accept or provide inputs to each other using some other mechanism.

Figure 3:
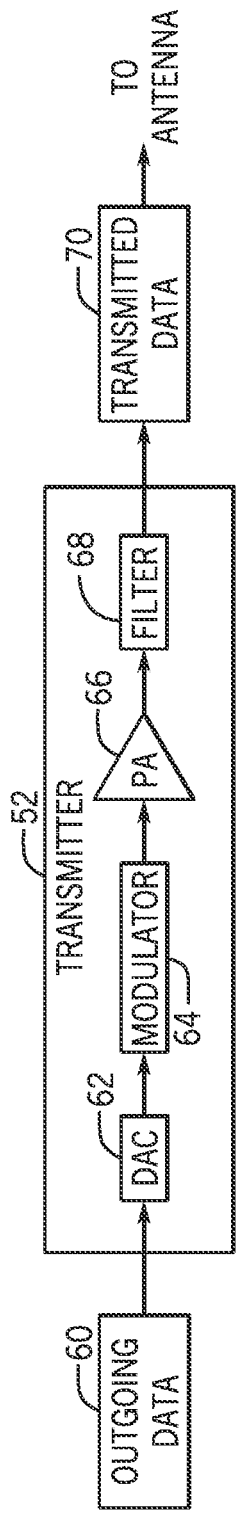
FIG. 3 is a schematic diagram of a transmitter (e.g., transmitter circuitry) of the user equipment of FIG. 1, according to embodiments of the present disclosure.

FIG. 3 is a schematic diagram of the transmitter 52 (e.g., transmit circuitry), according to embodiments of the present disclosure. As illustrated, the transmitter 52 may receive outgoing data 60 in the form of a digital signal to be transmitted via the one or more antennas 55. A digital-to-analog converter (DAC) 62 of the transmitter 52 may convert the digital signal to an analog signal, and a modulator 64 may combine the converted analog signal with a carrier signal to generate a radio wave. A power amplifier (PA) 66 receives the modulated signal from the modulator 64. The power amplifier 66 may amplify the modulated signal to a suitable level to drive transmission of the signal via the one or more antennas 55. A filter 68 (e.g., filter circuitry and/or software) of the transmitter 52 may then remove undesirable noise from the amplified signal to generate transmitted data 70 to be transmitted via the one or more antennas 55. The filter 68 may include any suitable filter or filters to remove the undesirable noise from the amplified signal, such as a bandpass filter, a bandstop filter, a low pass filter, a high pass filter, and/or a decimation filter. Additionally, the transmitter 52 may include any suitable additional components not shown, or may not include certain of the illustrated components, such that the transmitter 52 may transmit the outgoing data 60 via the one or more antennas 55. For example, the transmitter 52 may include a mixer and/or a digital up converter. As another example, the transmitter 52 may not include the filter 68 if the power amplifier 66 outputs the amplified signal in or approximately in a desired frequency range (such that filtering of the amplified signal may be unnecessary).

Figure 4:
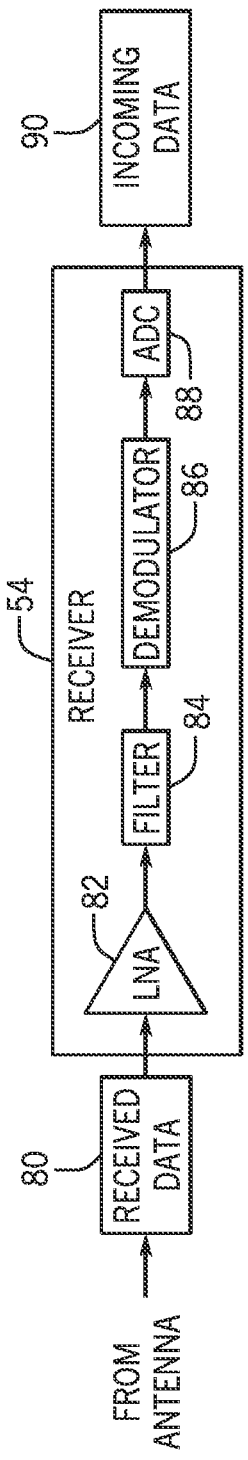
FIG. 4 is a schematic diagram of a receiver (e.g., receiver circuitry) of the user equipment of FIG. 1, according to embodiments of the present disclosure.

FIG. 4 is a schematic diagram of the receiver 54 (e.g., receive circuitry), according to embodiments of the present disclosure. As illustrated, the receiver 54 may receive received data 80 from the one or more antennas 55 in the form of an analog signal. A low noise amplifier (LNA) 82 may amplify the received analog signal to a suitable level for the receiver 54 to process. A filter 84 (e.g., filter circuitry and/or software) may remove undesired noise from the received signal, such as cross-channel interference. The filter 84 may also remove additional signals received by the one or more antennas 55 which are at frequencies other than the desired signal. The filter 84 may include any suitable filter or filters to remove the undesired noise or signals from the received signal, such as a bandpass filter, a bandstop filter, a low pass filter, a high pass filter, and/or a decimation filter. A demodulator 86 may remove a radio frequency envelope and/or extract a demodulated signal from the filtered signal for processing. An analog-to-digital converter (ADC) 88 may receive the demodulated analog signal and convert the signal to a digital signal of incoming data 90 to be further processed by the user equipment 10. Additionally, the receiver 54 may include any suitable additional components not shown, or may not include certain of the illustrated components, such that the receiver 54 may receive the received data 80 via the one or more antennas 55. For example, the receiver 54 may include a mixer and/or a digital down converter.

As discussed above, the user equipment 10 may be able to scan, via the receiver 54 of the user equipment 10, for signals sent by one or more communication hubs, such as a base station, high altitude base station, a satellite, a ground station, and so on. The user equipment 10 may determine, based on determining network parameters of the identified communication hubs, which one or more communication hubs to establish a connection with based on a signal strength of the one or more communication hubs. The user equipment 10 may update the list of network parameters over time, and adjust the communication hub connections based on the signal strength of the one or more communication hubs determined from the updated list of network parameters.

Figure 5:
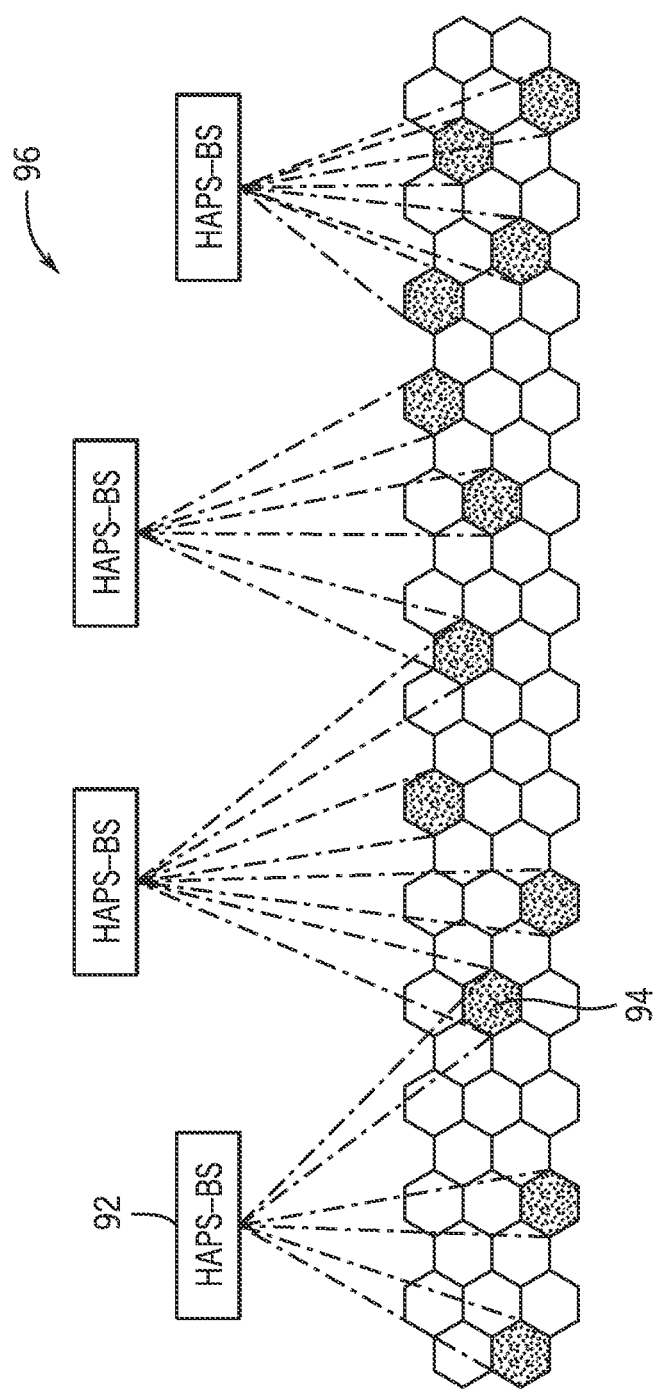
FIG. 5 is a schematic diagram of multiple communication hubs of a network and their corresponding coverage areas, according to embodiments of the present disclosure.

With the foregoing in mind, FIG. 5 is a schematic diagram of multiple communication hubs 92 of a network 96 and their corresponding coverage areas 94. As discussed above, the multiple communication hubs 92 may include terrestrial base stations, non-terrestrial base stations, High Altitude Platforms (HAPs) base stations, satellites, ground stations, access points, gateways, and so on. Each of the multiple communication hubs 92 may be fixed (e.g., stationary) or moving relative to the ground, and may include one or more antennas that direct one or more beams (e.g. fixed and/or steerable beams) that may be used to communicate data between the communication hubs 92 and the one or more user equipment 10 within the coverage areas 94 of the communication hubs 92. It should be understood that the network 96 may be a single network 96 (e.g., a non-terrestrial network (NTN), a terrestrial network), or may include multiple networks 96.

In some geographical areas, coverage areas 94 of multiple communication hubs 92 may overlap (e.g., one or more beams of different communication hubs 92 overlap within a same coverage area). According to the present embodiments, in a coverage area 94 in which the multiple communication hubs 92 overlap, the user equipment 10 located in the coverage area 94 may establish connections with the multiple communication hubs 92. The multiple communication hubs 92 may communicate with the user equipment 10 concurrently and/or may implement frequency multiplexing and/or time multiplexing (e.g., beamed signals may only include certain frequencies and/or be sent at certain times) to support multiple communication hub 92 connectivity with the user equipment 10. Additionally, the user equipment 10 may experience different connection strengths from different communication hubs 92 depending on the communication hub 92 locations (e.g., distances the communication hubs 92 are from the user equipment 10, transmission signal strength of the communication hubs 92, obstructions in between the communication hubs 92 and the user equipment 10, and so on). For example, in some embodiments, the communication hub 92 may include a high altitude base station or a satellite that may change location in the sky over time. This may affect user equipment connection strength to the communication hub 92 during the time period in which the communication hub 92 (e.g., a high altitude base station or satellite) changes location. In other embodiments, such as when the communication hub 92 may include a base station, the communication hub 92 may be stationary and connection strength with the user equipment 10 may not change over time due to location of the communication hub 92, but still may be affected by other connection parameters, such as shadowing at the user equipment location, moving obstructions, and so on. To mitigate this, the user equipment 10 may connect to different communication hubs 92 over time based on signal strength of the communication hubs 92 determined by the connection parameters.

Figure 6:
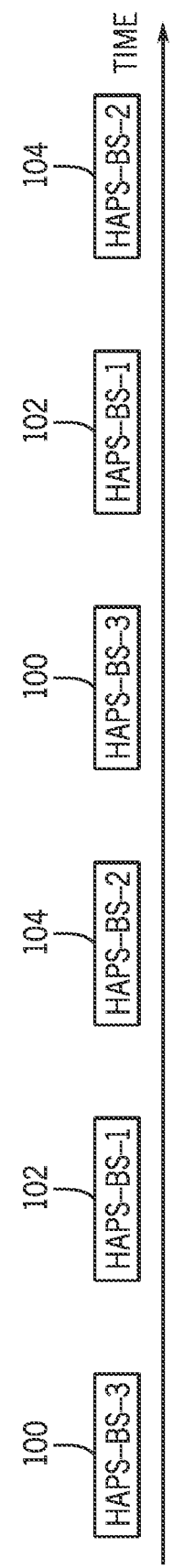
FIG. 6 is a timing diagram of user equipment connectivity to multiple communication hubs over time, according to embodiments of the present disclosure.

With the foregoing in mind, FIG. 6 is a timing diagram of user equipment connectivity to multiple communication hubs 92 over time, in accordance with an embodiment. The user equipment 10 may establish connections with one or more communication hubs 92 over time based on network parameters (e.g., parameters affecting connection strength of the user equipment 10 to the communication hub 92). The user equipment 10 may monitor network parameters of one or more communication hubs 92 within range of the user equipment 10. For example, the user equipment 10 may monitor an angle or location of the communication hub 92 relative to the user equipment 10, angle of the user equipment 10, signal strength (e.g., a received signal strength indicator, a reference signal received power, and so on), signal quality (e.g., a signal to noise ratio, a signal to interference plus noise ratio, a signal to noise plus interference ratio, a reference signal received quality, and so on), shadowing at the communication hub 92, or any other network parameter affecting connection strength. Additionally, the user equipment 10 may obtain a higher throughput by communicating with the multiple communication hubs 92 as a result of aggregating throughput from the multiple communication hubs 92.

For example, the user equipment 10 may determine network parameters of the one or more communication hubs 92 when the user equipment 10 is within a coverage area 94 at a first time and may establish a connection with a communication hub 100 (e.g., via one or more beams formed by the communication hub 100) that provides coverage to the coverage area 94 at the first time. The user equipment 10 may then update network parameters (including those corresponding to other communication hubs) at a second time, and determine, based on the updated network parameters, that a greater connection strength can be achieved by connection to an additional communication hub 102. The user equipment 10 may then establish a connection with the additional communication hub 102 (e.g., via one or more beams formed by the communication hub 102), and may send and/or receive data to and/or from the additional communication hub 102. In some embodiments, the user equipment 10 may continue to communicate with the communication hub 100. The user equipment 10 may continuously monitor network parameters of the one or more communication hubs 92 over time, and may dynamically update connections based upon determined signal strength of the communication hubs 92 based on the updated network parameters. In this way, the user equipment 10 may achieve efficient and/or increased network strength based on regularly updating connection parameters of the one or more communication hubs 92. It should be understood, that the user equipment 10 may constantly or periodically (e.g., every one second, five seconds, ten seconds, one minute, five minutes, ten minutes, and so on) update the connection parameters over time. For example, at a third time the user equipment 10 may establish a connection with a third communication hub 104 based on the connection parameters, and update the connection parameters at a fourth time. It should be understood that the user equipment 10 may establish (and cease) connections with one or more communication hubs 92 at different points in time depending on updated connection parameters. The user equipment 10 may also update connection parameters based on user equipment usage and/or based on communication requests of the user equipment 10, to increase signal strength based on user equipment needs.

Figure 7:
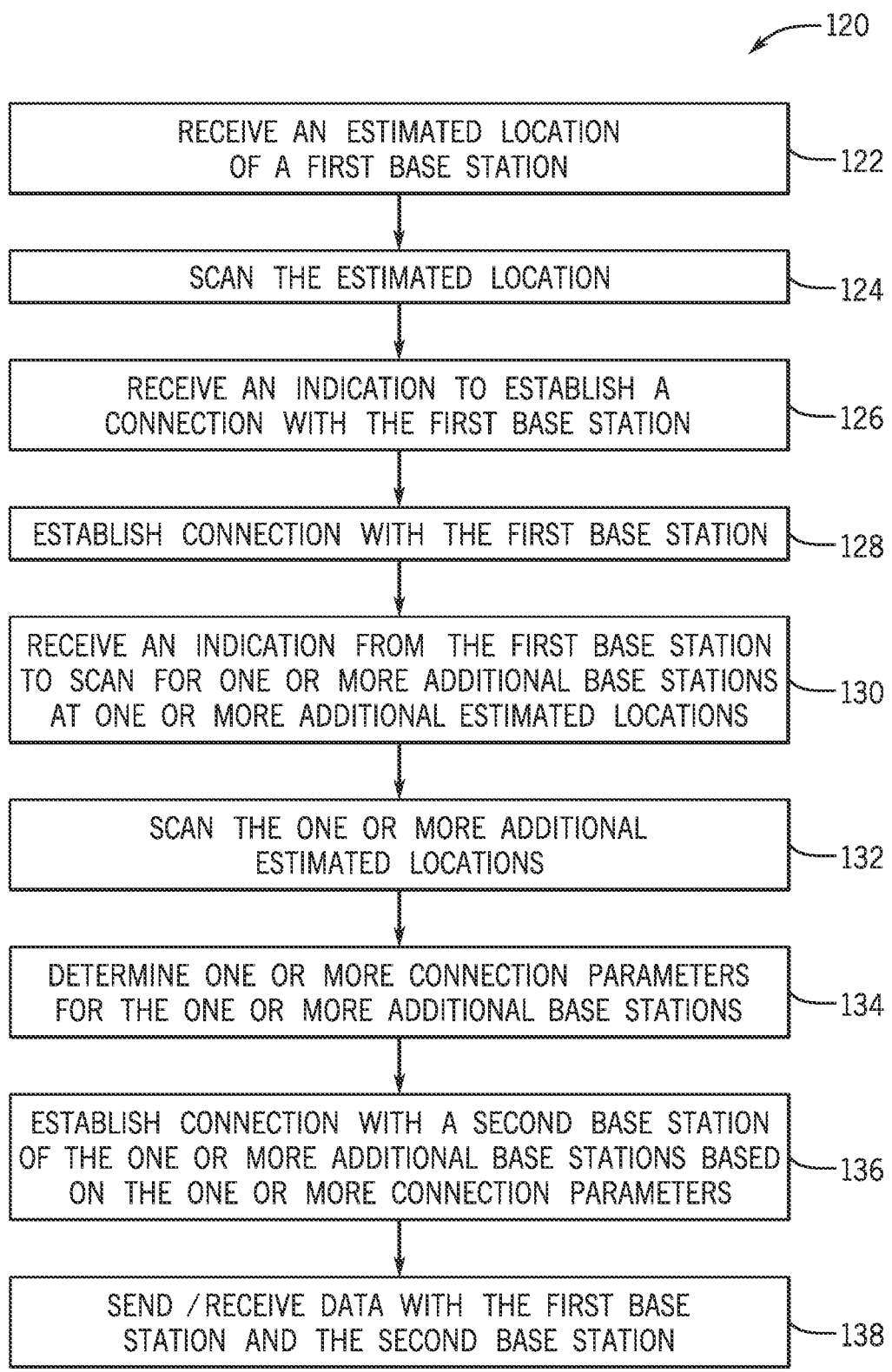
FIG. 7 is a flow diagram of a method for user equipment to connect to one or more communication hubs based on a scan of estimated locations, according to embodiments of the present disclosure.

With the foregoing in mind FIG. 7 is a flow diagram of a method 120 for the user equipment 10 to connect to one or more communication hubs 92 based on a scan of estimated locations, in accordance with an embodiment. The user equipment 10 may scan for wireless signals and identify one or more base stations (e.g., communication hubs 92) that are able to establish one or more connections with the user equipment 10. Additionally, the user equipment 10 may determine one or more connection parameters for the one or more base stations, and dynamically update a table and/or list that stores the connection parameters for each of the one or more base stations. It should be understood that although base stations are referred to in this embodiment, the user equipment 10 may also or alternatively determine and update connection parameters for terrestrial base stations, non-terrestrial base stations, HAPs base stations, satellites, ground stations, access points, gateways, and the like, using the same method 120.

Any suitable device (e.g., a controller) that may control components of the user equipment 10, such as the processor 12, may perform the method 120. In some embodiments, the method 120 may be implemented by executing instructions stored in a tangible, non-transitory, computer-readable medium, such as the memory 14 or storage 16, using the processor 12. For example, the method 120 may be performed at least in part by one or more software components, such as an operating system of the user equipment 10. While the method 120 is described using steps in a specific sequence, it should be understood that the present disclosure contemplates that the described steps may be performed in different sequences than the sequence illustrated, and certain described steps may be skipped or not performed altogether.

In process block 122, the user equipment 10 receives an estimated location (e.g., a geographical location, latitude and/or longitude coordinates, azimuth and elevation, ephemeris data, trajectory information, and so on) of a first base station of the network 96. The user equipment 10 may receive the estimated location, via a currently established connection to the network 96 or based on data loaded onto the user equipment 10 at a previous time. At process block 124, the user equipment 10 scans the estimated location, via the receiver 54 of the user equipment 10, to identify the first base station within the geographical area.

At process block 126, the user equipment 10 receives an indication from the first base station that instructs the user equipment 10 to establish a connection with the first base station (e.g., via one or more beams formed by the base station). The user equipment 10, at process block 128, establishes a connection with the first base station. The user equipment 10 may then send and/or receive data (e.g., user data) with the first base station, via the receiver 54 and transmitter 52 of the user equipment 10.

At process block 130, the user equipment 10 receives an additional indication, via the receiver 54, from the first base station to scan for one or more additional base stations at one or more additional estimated locations. The one or more additional estimated locations may be within the same range as the previous estimated location of the first base station, or may be within a different range than the estimated location of the first base station. The first base stations estimated location may be a first distance from the user equipment, and the one or more additional base stations may be the same distance as the first distance from the user equipment and/or one or more different distances from the user equipment relative to the first distance. For example, the first base stations estimated location may be 20 meters from the user equipment, and the one or more additional base stations may be 20 meters, 30 meters, 40 meters, 50 meters, or any other suitable distance from the user equipment. At process block 132, the user equipment 10 scans for the one or more additional base stations within the additional estimated locations, via the receiver 54 of the user equipment 10. The user equipment 10 may continuously scan the one or more estimated locations to locate the one or more additional base stations and/or may initiate scans based on communication with the base stations.

Once the user equipment 10 has identified the one or more additional base stations, the user equipment 10, at process block 134, determines one or more connection parameters corresponding to connection strength of the one or more additional base stations. The connection parameters may correspond to an angle of the one or more additional base stations relative to the user equipment 10, a position of the one or more additional base stations relative to the user equipment 10, an amount of shadowing at the base station location relative to the user equipment 10, an amount of available bandwidth of the base station, signal strength (e.g., a received signal strength indicator, a reference signal received power, and so on), signal quality (e.g., a signal to noise ratio, a signal to interference plus noise ratio, a signal to noise plus interference ratio, a reference signal received quality, and so on), or any other connection parameters that may affect the connection strength. Additionally, the user equipment 10 may generate and/or store a table including the one or more additional base stations and the determined connection parameters.

The user equipment, at process block 136, establishes a connection with a second base station of the one or more additional base stations based on the connection parameters corresponding the second base station. In some embodiments, the user equipment 10 selects the second base station based on determining that the second base station has a greater signal strength and/or quality (e.g., compared to a threshold signal strength and/or quality) based on the connection parameters. The user equipment 10, at process block 138, sends and/or receives data (e.g., user data) from the first base station and the second base station. In some embodiments, the first base station and the second base station may receive and transmit based on network scheduling with the user equipment 10. For example, the first base station and the second base station may implement frequency multiplexing and time multiplexing to enable communication with the user equipment 10. The user equipment 10 may also communicate (e.g., send information to and receive information) with the one or more base stations concurrently. It should be understood that the user equipment 10 may update the table of connection parameters dynamically over time, and establish connections with the one or more base stations based on the updated table of connection parameters.

Figure 8:
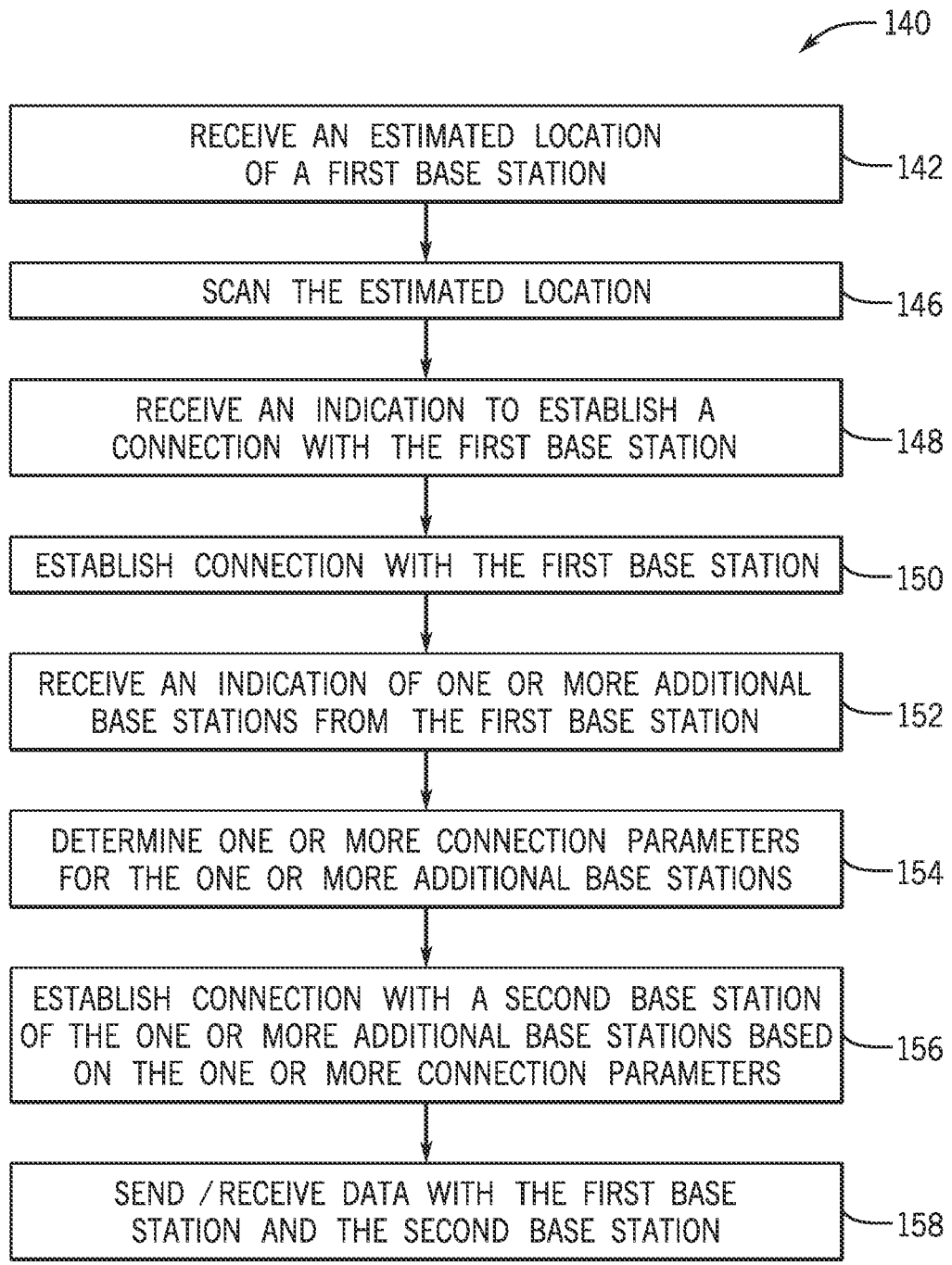
FIG. 8 is a flow diagram of a method for user equipment to connect to one or more communication hubs, according to embodiments of the present disclosure.

With the foregoing in mind, FIG. 8 is a flow diagram of a method 140 for user equipment 10 to connect to one or more communication hubs, in accordance with an embodiment. The user equipment 10 may receive an indication of one or more additional base stations for possible connection within a geographical area, and determine connection parameters for the one or more additional base stations. The user equipment 10 may then use the connection parameters to establish a connection with a base station that is determined to have a greater signal strength and/or quality (e.g., compared to a threshold signal strength and/or quality) based on the connection parameters.

Any suitable device (e.g., a controller) that may control components of the user equipment 10, such as the processor 12, may perform the method 140. In some embodiments, the method 140 may be implemented by executing instructions stored in a tangible, non-transitory, computer-readable medium, such as the memory 14 or storage 16, using the processor 12. For example, the method 140 may be performed at least in part by one or more software components. While the method 140 is described using steps in a specific sequence, it should be understood that the present disclosure contemplates that the described steps may be performed in different sequences than the sequence illustrated, and certain described steps may be skipped or not performed altogether.

In process block 142, the user equipment 10 receives an estimated location (e.g., a geographical location, latitude and/or longitude coordinates, azimuth and elevation, ephemeris data, trajectory information, and so on) of a first base station of a network. The user equipment 10 may receive the estimated location, via an already established connection to the network or based on data pre-loaded onto the user equipment 10 at a previous time. At process block 146, the user equipment 10 scans the estimated location, via the receiver 54 of the user equipment 10, to identify the first base station within the geographical area.

At process block 148, the user equipment 10 receives an indication from the first base station that instructs the user equipment 10 to establish a connection with the first base station. The user equipment 10, at process block 150, establishes a connection with the first base station. The user equipment 10 then sends and/or receives data (e.g., user data) from the first base station. The user equipment 10, at process block 152, receives an indication to connect to one or more additional base stations from the first station base station. The indication may include a list include of the one or more additional base stations with which the user equipment 10 may establish a connection, and coordinates or relative locations of the one or more additional base stations. Alternatively, the user equipment 10 may have the list pre-loaded onto the user equipment 10 at a previous time, and may be able to retrieve the list from the memory 14 or storage 16 and search the list dynamically to identify one or more additional base stations which may provide network coverage of the user equipment 10. The pre-loaded list may include one or more coordinates of the additional base stations, one or more geographical areas of the additional base stations, and the like.

Once the user equipment 10 has identified the one or more additional base stations, the user equipment 10, at process block 154, determines one or more connection parameters corresponding to connection strength of the one or more additional base stations. The connection parameters may correspond to an angle of the one or more additional base stations relative to the user equipment 10, a position of the one or more additional base stations relative to the user equipment 10, an amount of shadowing at the base station location relative to the user equipment 10, an amount of available bandwidth of the base station, signal strength (e.g., a received signal strength indicator, a reference signal received power, and so on), signal quality (e.g., a signal to noise ratio, a signal to interference plus noise ratio, a signal to noise plus interference ratio, a reference signal received quality, and so on), and any other connection parameters that may affect the strength of the connection. The user equipment 10 may generate and/or store a table including the one or more additional base stations and the determined connection parameters. Additionally, the one or more connection parameters may be determined based on a pre-stored list within the user equipment memory 14. The pre-stored list may include one or more connection parameters previously recorded for the one or more additional base stations, and the user equipment 10 may update the one or more pre-stored connection parameter dynamically over time.

The user equipment 10, at process block 156, establishes a connection with a second base station of the one or more additional base stations based on the connection parameters corresponding the second base station. The user equipment 10 selects the second base station based on determining that the second base station has a greater signal strength and/or quality (e.g., compared to a threshold signal strength and/or quality) with the user equipment 10 based on the connection parameters. The user equipment 10, at process block 158, sends and/or receives data (e.g., user data) to and/or from the first base station and the second base station. The first base station and the second base station may receive and transmit data based on network scheduling with the user equipment 10. For example, the first base station and the second base station may implement frequency multiplexing and time multiplexing to enable communication with the user device 10. The user equipment 10 may also communicate (e.g., send information to and receive information from) the one or more base stations concurrently. It should be understood that the user equipment 10 may update the table of connection parameters dynamically over time, and establish connections with the one or more base stations based on the updated table of connection parameters.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ," it is intended that such elements are to be interpreted under 35 U.S.C. 112 (f). However, for any claims containing elements designated in any other manner, it is intended that such elements are not to be interpreted under 35 U.S.C. 112 (f).

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The invention claimed is:

1. A mobile device comprising:
one or more antennas;
a transceiver configured to send and receive signals via the one or more antennas; and
processing circuitry communicatively coupled to the transceiver and configured to
establish a first connection with a first base station based on a first estimated location of the first base station,
receive an indication from the first base station to scan for a second base station at a second estimated location,
establish a second connection with the second base station based on the second estimated location and one or more connection parameters, and
send or receive signals, using the transceiver, with the first base station and the second base station.

2. The mobile device of claim 1, wherein the one or more connection parameters comprise a distance to the second base station, an angle between the second base station and the mobile device, a signal quality of a connection with the second base station, or any combination thereof.

3. The mobile device of claim 1, wherein the processing circuitry is configured to update the one or more connection parameters based on a third base station and establish a third connection with the third base station based on the one or more connection parameters as updated.

4. The mobile device of claim 1, wherein the processing circuitry is further configured to send or receive signals, via the transceiver, with the first base station and the second base station based on time-division multiplexing.

5. The mobile device of claim 1, wherein the processing circuitry is configured to send or receive signals, via the transceiver, with the first base station and the second base station based on frequency-division multiplexing.

6. A method for mobile communications comprising:
receiving, via a receiver of a user equipment, a first estimated location of a first base station;
scanning, via the receiver, the first estimated location;
establishing a connection with the first base station;
receiving, via the receiver, an indication of a second base station and one or more connection parameters for the second base station;
establishing a connection with the second base station based on the one or more connection parameters; and
sending, using a transmitter of the user equipment, signals to the first base station and the second base station.

7. The method of claim 6, wherein the second base station comprises a non-terrestrial base station.

8. The method of claim 6, wherein the connection with the first base station is maintained after connection with the second base station.

9. The method of claim 6, wherein the indication of the second base station comprises information corresponding to coordinates of the second base station, relative locations of the second base station, or any combination thereof.

10. The method of claim 6, wherein the estimated location of the first base station is a first distance away from the user equipment, and wherein the second base station is a second distance away from the user equipment different than the first distance.

11. The method of claim 6, wherein the indication of the second base station comprises instructions for retrieving, via processing circuitry of the user equipment, a list loaded onto the user equipment at a previous time, the list comprises one or more coordinates of the second base station, one or more relative locations of the second base station, or both.

12. The method of claim 6, wherein the one or more connection parameters of the second base station comprises a signal strength of the second base station, the method comprising determining, at processing circuitry of the user equipment, that the signal strength of the second base station exceeds a threshold signal strength prior to establishing the connection with the second base station.

13. A mobile device comprising:
a memory;
one or more antennas;
a transceiver configured to send and receive signals via the one or more antennas; and processing circuitry communicatively coupled to the transceiver and configured to cause the transceiver to receive an estimated location of a first base station and scan the estimated location for the first base station, establish a connection with the first base station based on scanning the estimated location, cause the transceiver to receive an indication from one or more additional base stations to scan one or more additional estimated locations for the one or more additional base stations, cause the transceiver to receive one or more connection parameters of the one or more additional base stations from the memory;

establish a connection with a second base station of the one or more additional base stations based on the one or more connection parameters; and cause the transceiver to send or receive signals with the first base station and the second base station.

14. The mobile device of claim 13, wherein the one or more connection parameters comprise a distance to the one or more additional base stations, an angle relative to the one or more additional base stations and the mobile device, a signal quality of a connection with the one or more additional base stations, or any combination thereof.

15. The mobile device of claim 13, wherein the memory is configured to store one or more connection parameters of the one or more additional base stations, one or more coordinates of the one or more additional base stations, one or more relative locations of the one or more additional base stations, or any combination thereof.

16. The mobile device of claim 15, wherein the one or more connection parameters include initial connection parameters associated with one or more initial locations of the one or more additional base stations.

17. The mobile device of claim 13, wherein the processing circuitry is configured to periodically determine the one or more connection parameters, and establish an additional connection with a third base station of the one or more additional base stations based on one or more subsequently determined connection parameters.

18. The mobile device of claim 17, wherein the processing circuitry is configured to update the one or more connection parameters of the one or more additional base stations stored in the memory based on the one or more subsequently determined connection parameters.

19. The mobile device of claim 13, wherein the processing circuitry is configured to determine a signal strength of the mobile device with the one or more additional base stations based on the one or more connection parameters.

20. The mobile device of claim 19, wherein the processing circuitry is configured to establish the connection with the second base station based on the signal strength of the mobile device.

* * * * *